March 3, 1931. G. J. BARTON ET AL 1,794,357
ELECTRICAL GEAR SHIFT
Filed Aug. 1, 1930   4 Sheets-Sheet 1
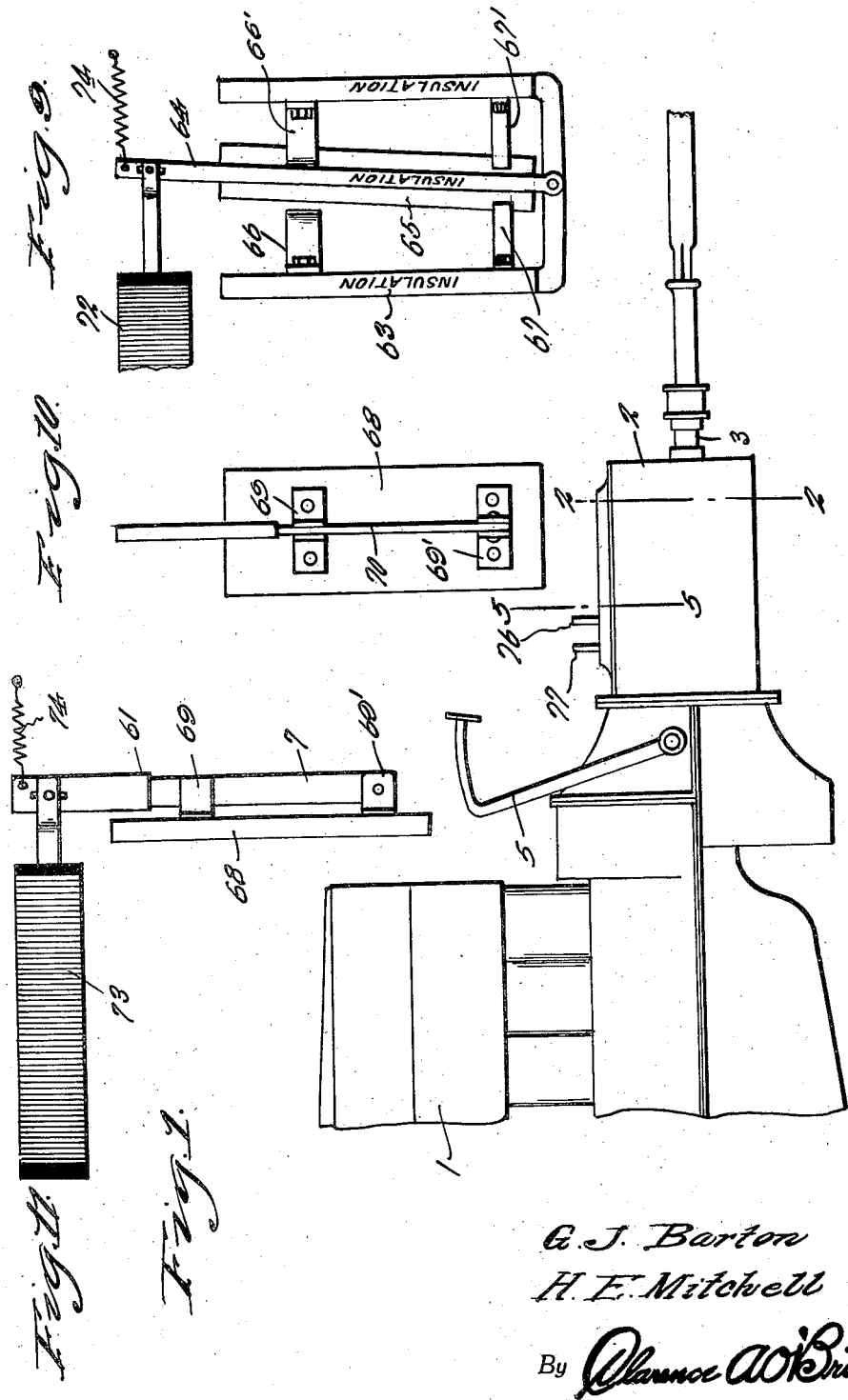
Inventor
G. J. Barton
H. E. Mitchell
By Clarence A. O'Brien
Attorney March 3, 1931.　　G. J. BARTON ET AL　　1,794,357
ELECTRICAL GEAR SHIFT
Filed Aug. 1, 1930　　4 Sheets-Sheet 2
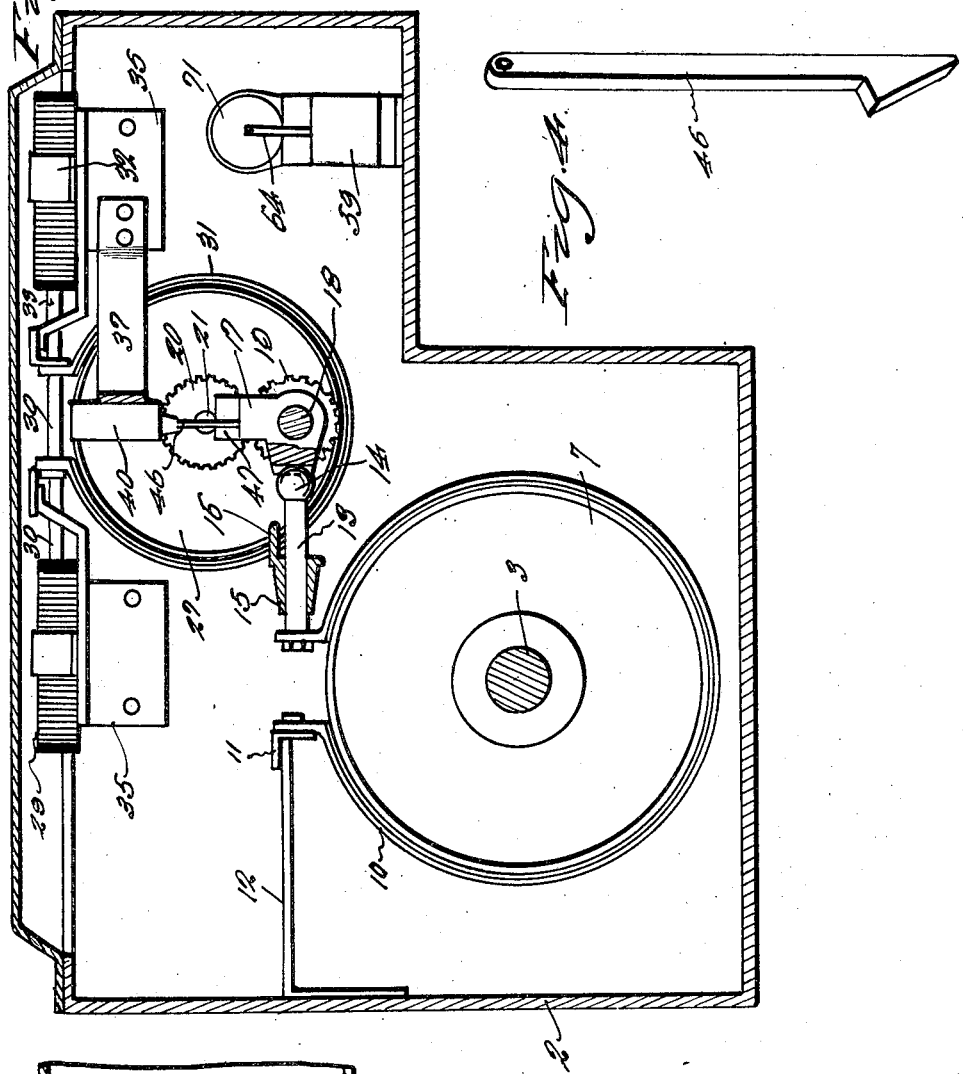
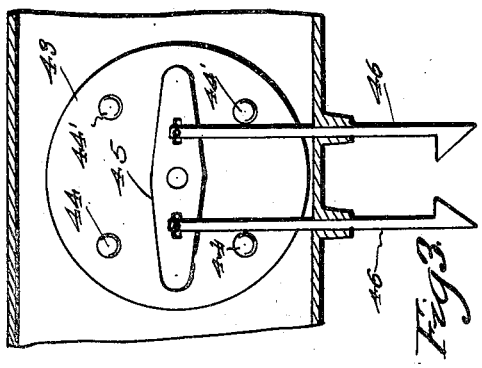
Inventor
G. J. Barton
H. E. Mitchell
By Clarence A. O'Brien
Attorney

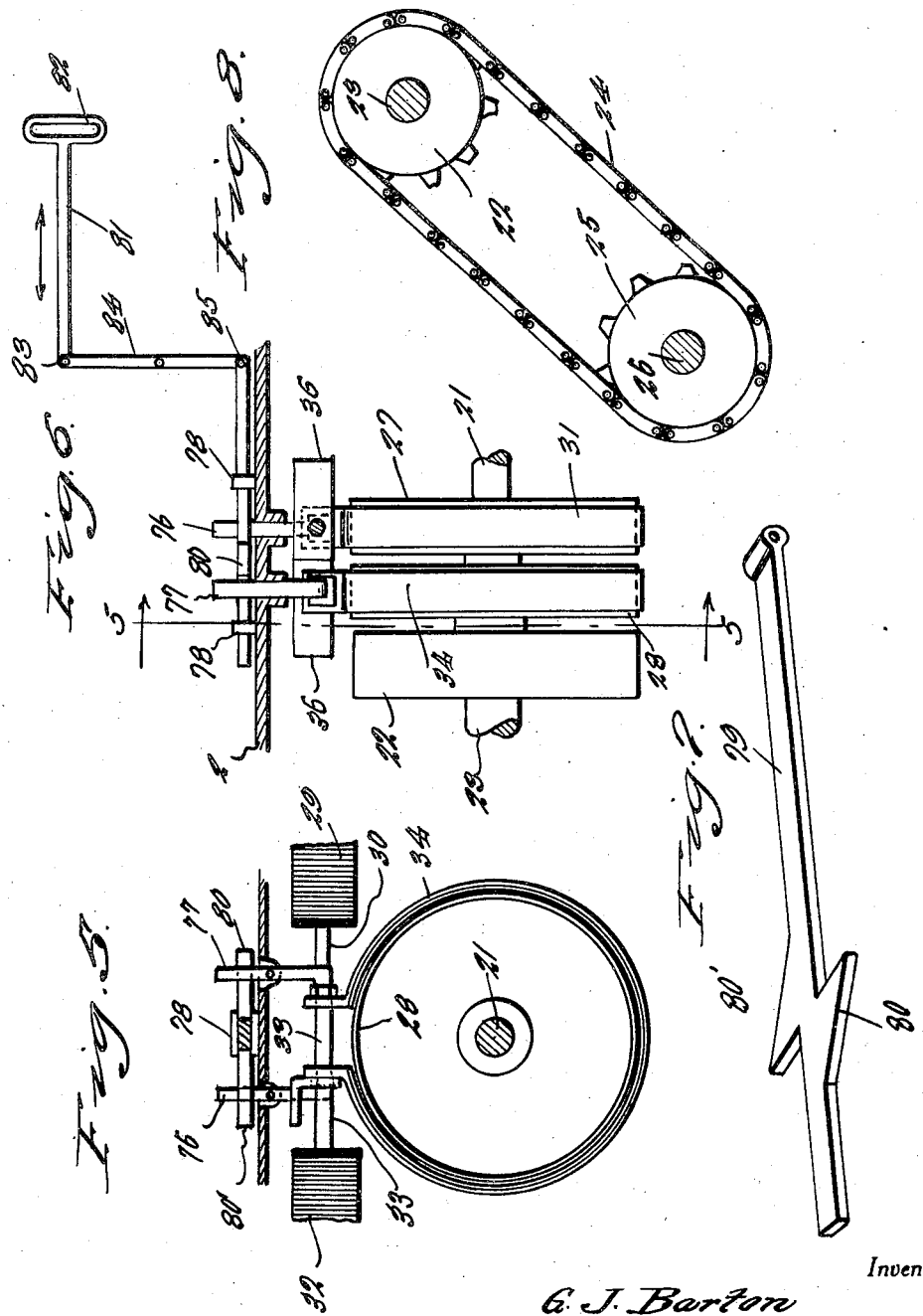

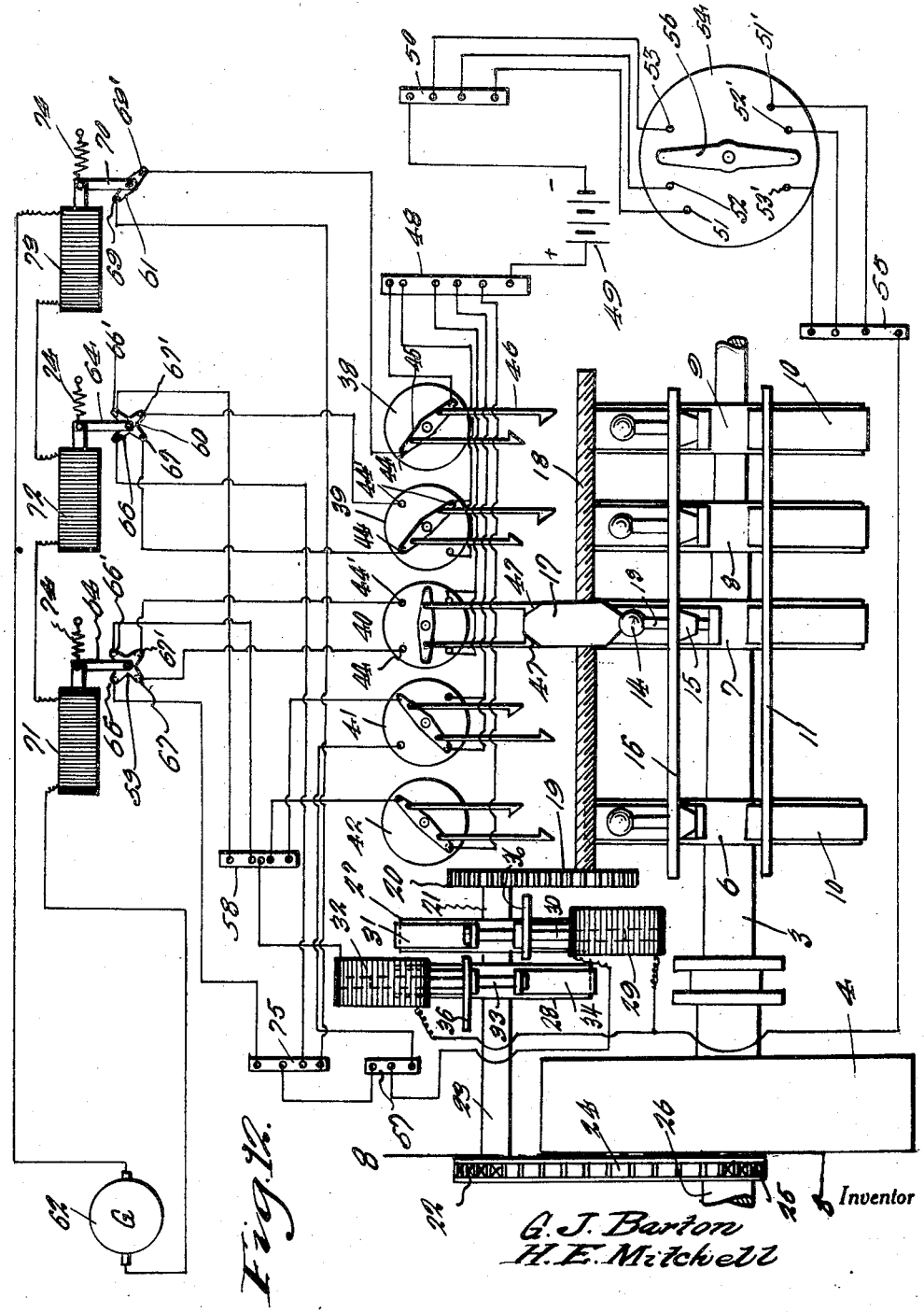

Patented Mar. 3, 1931

1,794,357

UNITED STATES PATENT OFFICE

GRAHAM J. BARTON AND HUGH E. MITCHELL, OF STARKVILLE, MISSISSIPPI

ELECTRICAL GEAR SHIFT

Application filed August 1, 1930. Serial No. 472,387.

This invention relates to improvements in gear shifting mechanism and particularly to an electric automatic gear shifting device for shifting the transmission gears of automobile transmission assemblies of the planetary gear type.

Briefly summarized, the invention embodies two large solenoids connected to a battery and automatically controlled by three smaller solenoids connected with and operated from a generator; the larger solenoids operating means for tightening the bands of shifting drums which transmit power to the worm drive of a gear shifting member.

An object of the invention is to provide means for effecting a change or shift of transmission gears at the proper speed automatically and silently, thereby eliminating the noise usually incident to the shifting of transmission gears.

An additional object of the invention is to provide an electrically operated shift for planetary transmissions supplemented by a hand operated shift to be used in cases of emergency.

The above objects are attained by the mechanism illustrated in the accompanying drawings, wherein:

Figure 1 is a side elevation of a portion of an automobile transmission assembly with the invention applied thereto, Figure 2 is a sectional view of the transmission housing with associated parts of the invention, Figure 3 is an enlarged detail view of one of the gear switches with the switch casing shown in section, Figure 4 is a detail view of a gear switch lever, Figure 5 is a sectional view of the shifting drum assembly taken on line 5—5 of Figure 6, Figure 6 is an end view of the piston drum assembly showing the emergency hand shift applied thereto, Figure 7 is a detail view of the slide rod of the emergency hand shift, Figure 8 is a detail view of the silent chain drive from the engine crank shaft to the drum shaft of the invention, Figure 9 is a detail view of one of the two-way generator switches, Figure 10 is a detail view of a one way generator switch, Figure 11 is a detail view in side elevation showing an assembly of a generator switch and its operating solenoid, Figures 12 is a diagrammatic view of the invention.

In the drawings, the reference numeral 1 indicates generally an engine assembly and transmission of the planetary gear shift type including the transmission housing 2 disposing the drive shaft 3 which is adapted to be driven from the engine fly wheel 4 by the usual disk clutch mechanism operated by the foot clutch pedal 5. Mounted on the drive shaft within the housing are a plurality of speed gears including a reverse gear 6, low and high speed gears 7 and 9 respectively, and an intermediate speed gear 8. Each speed gear embodies planetary gearing of the usual and well known construction and has a control band 10 of the split type and a tie bar 11 connects the free ends of one side of the bands, being suitably anchored by brackets 12 to a wall of the housing 2 to hold the bands stationary on such side.

Secured to the opposite end of each band is one end of a short horizontally disposed rod 13 terminating at its outer end in a knob 14. Rods 13 are slidably supported in the bearing sleeve 15 of a single bearing bracket 16 and are respectively shifted to compress the bands on the gears by a shifting nut 17 which moves on a worm shaft 18 extending parallel to the drive shaft 3. The worm is rotated through the medium of a pinion 19 on one end thereof and in mesh with a driving pinion 20 fixed on the inner section 21 of a drum shaft which has a sprocket 22 on its outer section 23 connected by a driving chain 24 with a sprocket 25 on the crank shaft 26.

The nut 17 is held from turning on the shaft by any suitable means. The sections of the drum shaft are coupled by a pair of shifting drums 27 and 28 of the planetary type which controls the direction of rotation of pinion 20; drum 27 rotating the pinion in a clockwise direction and drum 28 rotating the pinion in a counter clockwise direction. Each shifting drum has a compression band adapted to be tightened by the energization of a large solenoid for bringing the drum to rest.

When a drum is thus held against rotation, it engages gears of a planetary type of transmission in such manner as to rotate the pinion 20 in either a clockwise or counter clockwise direction, according to which particular drum is brought to rest.

The drum 27 is controlled by the solenoid 29 having a plunger 30 connected to the band 31 and drum 28 is controlled by the solenoid 32 having a plunger 33 connected with the band 34. The solenoids are suitably mounted adjacent the upper end of the transmission housing, as shown at 35 in Figure 2 and on opposite sides of the drums with their respective plungers slidably extending through the adjacent stationary terminal of the corresponding band and attached to the terminal remote therefrom.

The stationary terminals of the bands are suitably anchored to supporting bars 36 of the housing. Arranged within the transmission housing and suitably supported by brackets 37 so as to overhang the worm shaft 18 are a plurality of gear switches separately indicated at 38, 39, 40, 41 and 42 and respectively consisting of a circular switch plate 43 having contact points 44 and a centrally pivoted switch arm 45 from adjacent the ends of which depend a pair of pivotally supported actuating arms or trip levers 46. Switches 38 and 42 are one-way switches, having but a single pair of contact points each to be bridged by the switch arm, whereas the remaining switches are respectively provided with two pairs of contact points, as shown in Figure 3, adapted to be alternately bridged by the switch arm to provide a reversible or two-way switch.

The ends of the trip levers are adapted to be engaged by the shifting nut 17 as the latter is moved along the worm shaft. The shifting nut is provided at both its front and rear side with means 47 for engaging and lifting the trip levers to throw the switches. The lower contact points of the gear switches are connected by suitable conductors, as shown is Figure 12, to a terminal plate 48 which is connected with the positive side of a battery 49. Connected with the negative side of the battery is a terminal plate 50 having separate leads to the contact points 51, 52 and 53 on the dial plate 54 of a main switch located on the instrument board of the automobile. The dial plate is also provided with supplemental contact points 51', 52' and 53' which are connected by separate leads to a terminal plate 55 to which is connected one terminal of each of the solenoids 29 and 32.

Corresponding contacts of the main switch are adapted to be bridged for closing the various circuits by a centrally pivoted and manually-operated switch arm 56. Solenoids 29 and 32 have their other terminals connected to termial plates 57 and 58 respectively.

The flow of current through the large solenoids 29 and 32 is controlled by the switches 59, 60 and 61 which are operated automatically from the generator 62. The generator switches 59 and 60 are reversible or two-way throw switches which, as shown in Figure 9, respectively comprises a U-shaped frame 63 having a switch arm 64 pivotally mounted at its bottom end for swinging movement between the arms of the frame to alternately engage its knife 65 with the oppositely disposed upper contact fingers 66 and 66'. A pair of similar contact fingers 67 and 67' permanently engage the switch knife 65 adjacent its lower end.

The generator switch 61 is a single throw knife switch of the type shown in Figures 10 and 11 and embodies a switch plate 68 having upper and lower contact fingers 69 and 69' to the latter of which is pivoted the lower end of the switch knife arm 70. Each generator switch has associated therewith a small operating solenoid, as indicated at 71, 72 and 73; the plungers of each solenoid being connected with the switch arm of its associated switch for moving the arm in a counter clockwise direction, when the solenoid is energized, to close the circuit on the solenoid side of the switch.

Connected to each switch arm and acting oppositely to the pull of the solenoid plunger is a switch spring 74 for throwing the switch arm in a direction closing the circuit on the spring side of the switch. Springs 74 automatically operate to close the circuit upon failure of the solenoid. The solenoids 71, 72 and 73 are directly connected in series with the generator 62 and have different windings or numbers of ampere turns which cause a different amount of current to energize each solenoid.

Solenoid 71 has the greatest number of ampere turns and solenoid 73 has the smallest number. The variance in the energizing currents result from the variations of the speed of the generator which is dependent upon the speed of the engine of the car for its revolution per minute being operated from the engine shaft. The speed of the engine is regulated, of course, by the actuation of the accelerator pedal.

Enough current normally flows through the solenoids to maintain the switches in circuit opening position and the strength of the current increases proportionately as the speed of the engine is accelerated. When the current becomes so weak that its strength is negligible, the switches are then closed by the action of springs 74. As shown in Figure 12, the generator switch 73 has its lower contact points 69' connected with the upper contact point 44 of the one-way gear switch 38 and the top contact point 69 is connected with a terminal plate 75 having a lead to the terminal plate 57 of the large solenoid 29.

Generator switches 59 and 60 have their lower contact points 67 and 67' connected by suitable leads with the upper contact points 44 and 44' of the gear switches 40 and 39 respectively. The upper points 66 on the solenoid side of each switch 59 and 60 are connected with the terminal plate 75 associated with solenoid 29 and the upper points 66' on the spring side of each of said switches are connected with the terminal plate 58 of the solenoid 32. The generator switches and operating solenoids are suitably mounted in the transmission housing as illustrated in Figure 2.

When the parts are relatively positioned as shown in Figure 12, the transmission is in low gear and to obtain neutral, the main switch 54 is closed between contacts 52 and 52' completing the circuit in the solenoid 32 through the plate 55, main switch 54, plate 50, battery 49, plate 48, switch 41, and plate 58 to the solenoid 32. It will be observed that at this time the generator switches are in circuit opening position. When the solenoid 32 is sufficiently energized to cause the plunger to be drawn therein, the band on the shifting drum 28 is tightened to hold the drum against rotation for engaging planetary gears in such manner as to rotate the worm 18 in a counter clockwise direction whereby the shifting nut is moved to the left in Figure 12 and in a position directly under the neutral switch 41.

The abutment of the leading cam portion of the nut with the lowermost depending trip lever of the neutral switch throws the switch to open the circuit through the solenoid for deenergizing the same and thus releasing the drum. The worm shaft 18 ceases to revolve and the shifting nut is stationary until another switch is closed. Should the nut be positioned on either of the higher speed gears 8 and 9 at a time when the shift to neutral is made the usual foot pedal 5 of the standard disk type clutch assembly is operated to disengage the clutch to allow the shifting nut freedom to pass the band knobs 14 of the intervening gears without occasioning sudden or additional jerks to the car.

When shifting from neutral to low speed, the main switch is closed at the points 51 and 51' and the current flows from the positive side of the battery through the gear switches 38, 39 and 40 which are closed with respect to the solenoid side of the generator switches. The solenoids of the generator switches are at this time energized only sufficiently to maintain the switch arms 64 in circuit opening position. When the speed of the generator 62 is such as to sufficiently energize the solenoid 71 for closing the switch 59, the circuit to the solenoid 29 is completed and the shifting drum 27 is actuated to rotate the worm 18 in a clockwise direction for shifting the nut 17 to the right of Figure 12 until it bears directly upon the band-tightening nut of low gear 7. At the same instance that the shifting nut has compressed the band on gear 7, the gear switch 40 is opened by reason of the leading cam portion of the nut coming in contact with a trip lever 46 of the switch.

The opening of switch 40 interrupts the circuit through the solenoid 29 and enables the shifting nut to be held on the knob of the low gear until enough speed is gained by the generator 62 to sufficiently energize the solenoid 72 to close the switch 60. The closing of switch 60 reestablishes the circuit through the solenoid 29 and the worm is again rotated to move the shifting nut into engagement with the band of the intermediate gear 8. The operation then continues in the same manner as for shifting from neutral to low. When enough current is sent through solenoid 73 by the increased speed of the generator, the switch 61 will be closed and the solenoid 29 again energized to cause the shifting nut to be shifted to the highest speed gear 9 where it remains after throwing switch 38.

The switch arms of the main switch may then be moved into "off" position to break the circuit to the solenoids 29 and 32. The nut will remain engaged with the gear 9 until the main switch is again closed.

When the speed of the motor is suddenly lessened, as by the application of the brake and the release of the accelerator pedal, there is a corresponding decrease in the speed of the generator so that should the generator solenoid become too weak to counteract the pull of the generator spring, the switches 59, 60 and 61 are then closed by the action of the spring and if the main switch is closed, the circuit through the solenoid 32 is completed from the spring side of each switch 59 and 60. It results in the rotation of the worm shaft in the counter clockwise direction and the automatic return of the worm from high to low without stopping.

When the speed of the motor is gradually lessened, instead of being abruptly retarded, the switch 61 is opened by the action of spring 74 thereof overcoming the strength of the solenoid 73 which is the first in the series of solenoids to be weakened by a decrease in the speed of the generator beyond a predetermined limit.

No changes are occasioned in the relation of the parts, however, until the solenoid 72 has likewise become too weak to overcome the pull of spring 74 of switch 60. Switch 60 is then closed on the spring side and current is allowed to pass through the switches 39 and 60 to the solenoid 32 for shifting the nut from the high gear 9 to the intermediate gear 8. Upon further decrease in the speed of the generator switch 59 is closed by its spring and the circuit to the solenoid 32 reestablished through the switches 40 and 59 for shifting the nut to the low speed gear 7.

Although the nut will be stopped on each gear band in reversing from high to low, if the foot clutch is used, the return from high to low will be effected without any noticeable change. If the foot clutch is not used, the nut will remain on each band knob until the spring becomes the stronger. It will be observed that when the shifting nut is moved forwardly or rearwardly, in either case it leaves the gear switches in position for the proper operation of the shifting device.

In Figures 5, 6 and 7 are illustrated a hand shift to be used in cases of emergency. The hand shift consists of a pair of vertically extending rods 76 and 77 pivotally supported in the top plate of the transmission housing above the drums 27 and 28. These rods are fastened at their lower ends to the same side of the drum as the plungers of the solenoids 29 and 32; rods 76 operating the drums 27 and rods 77 operating the drum 28. Extending between the upper ends of the rods 76 and 77 and slidably supported in guides 78 is a slide rod 79 which, as shown in Figure 7, has laterally disposed offsets or cams 80 and 80' on relatively opposite sides and being longitudinally offset for energizing the upper portion of the pivoted rods 77 and 76 respectively.

A pull rod 81 is suitably mounted on the dashboard of the car and is provided at one end with a hand grip 82 and has its other end rigidly connected, as at 83, to one end of a centrally pivoted lever 84. The other end of lever 84 is hingedly connected at 85 to the slide rod 79.

When the hand grip is pulled to the right of Figure 6, the offset 80 of the slide rod is moved forwardly against the rod 77 and pivot the latter to compress the band 34 of the drum 28. When the hand grip is pushed to the left of the figure, the offset 80' is moved rearwardly against rod 76 which is thereby rocked off its pivot to tighten the band 31 of the drum 27. It will thus be apparent that the hand emergency shift operates to tighten the bands of the shifting drums similarly to the solenoids 29 and 32 and is adapted for use in operating the gear shift at any time the solenoid should fail to function properly.

In view of the foregoing, it is thought the construction, operation and advantages of the device will be readily understood as well as the fact that the invention is susceptible of various modifications and improvements within the scope of the appended claims.

Having thus described our invention, what we claim as new is:

1. A variable speed mechanism, comprising a plurality of variable speed units of the planetary gearing type having compression bands controlling the actuation thereof, a band compressing member, a worm shaft on which said member is threadedly engaged for movement longitudinally thereof, a driving shaft geared with said worm shaft, a pair of oppositely acting drums mounted on the drive shaft and coupled to said shaft by planetary gearing, a control band around each drum, a normally open circuit including a battery and a solenoid connnected with each control band of the said oppositely acting drums, a plurality of normally open switches in said circuit respectively having one terminal of each solenoid connected thereto, a generator unit including a generator and a plurality of switch solenoids connected in series therewith and relatively varying in the number of ampere turns, each of said solenoids being connected with one of said switches for closing the same when energized to complete the circuit through a solenoid of one of the said oppositely acting drums, and means tensioning the said switches and acting oppositely to the switch solenoids for closing the switch upon the energization of the switch solenoid for completing the circuit through the solenoid of the other oppositely acting drum.

2. In a variable speed gear mechanism, a plurality of variable speed units of the planetary gearing type, a shiftable gear-operating member, a normally open circuit including oppositely-acting members for shifting the said gear operating member, means for closing the circuit through one of the said oppositely-acting members for shifting the gear operating member in one direction, and means for closing the circuit through the other oppositely acting member for reversing the shift of the gear operating member.

3. In a variable speed gear mechanism, a plurality of variable speed units of the planetary gearing type, a shiftable gear-operating member, a normally open circuit including oppositely-acting means operable upon the closing of the circuit to shift the said gear-operating member, means for intermittently closing and opening the circuit through one of the said oppositely-acting means for advancing the gear operating member successively from one speed unit to the other, and means for intermittently closing and opening the circuit through the other oppositely-acting means for reversing the direction of movement of said gear operating member.

4. A variable speed gear mechanism including a power shaft, a transmission shaft having a plurality of variable speed units of the planetary gearing type, a shiftable gear actuating member engageable with said speed units for effecting actuation thereof, a normally open circuit including oppositely-acting means for shifting said gear actuating member upon the closing of the circuit, means operated from the said power shaft for closing the circuit through one of the said oppositely-acting means for advancing the said gear operating member successively into actuating engagement with said speed units from the lowest to the highest proportionately to the increase of speed in the power shaft, and means operable upon a decrease in the speed of said power shaft to close the circuit through the other oppositely actuating means for reversing the direction of movement of said gear operating member.

5. A variable speed gear mechanism including a power shaft, a transmission shaft having a series of variable speed units of the planetary gearing type, a shiftable gear actuating member engageable with said speed units for effecting actuation thereof, a normally open circuit including oppositely-acting means for shifting said gear actuating member upon the closing of the circuit, a series of normally open reversible switches in said circuit having actuating means controlled from said power shaft for successively operating the switches as the speed of the power shaft exceeds predetermined limits to complete the circuit through one of said oppositely acting means for advancing the gear operating member successively into actuating engagement with said speed units, means for automatically operating switches successively as the speed of the power shaft decreases below predetermined limits to complete the circuit through the other oppositely-acting means for reversing the direction of movement of said gear operating member.

6. A variable speed gear mechanism including a power shaft, a transmission shaft having a series of variable speed units of the planetary gearing type, a shiftable gear actuating member engageable with said spaced units for effecting actuation thereof, a normally open circuit including oppositely-acting means for shifting said gear actuating member upon the closing of the circuit, a series of normally open reversible switches in said circuit having actuating means controlled from said power shaft for successively operating the switches as the speed of the power shaft exceeds predetermined limits to complete the circuit through one of said oppositely acting means for advancing the gear operating member successively into actuating engagement with said speed units, means for automatically operating switches successively as the speed of the power shaft decreases below predetermined limits to complete the circuit through the other oppositely-acting means for reversing the direction of movement of said gear operating member, means operated by the said gear actuating member for temporarily interrupting the circuit during the intervals between the operations of the said switches.

7. A variable speed mechanism comprising a plurality of variable speed units of the planetary gearing type having compression bands controlling the actuation thereof, a band compressing member, a worm shaft on which said member is threadedly engaged for movement longitudinally thereof, a normally opened circuit including oppositely acting means operable upon the closing of the circuit to rotate said worm shaft to shift said band compressing member, means for closing the circuit through one of said oppositely acting members for shifting the band compressing member in one directon, and means for closing the circuit through the other oppositely acting member for reversing the shift of the band compressing member.

8. In a variable speed gear mechanism, a plurality of variable speed units of the planetary gearing type having compression bands controlling the actuation thereof, a band compressing member, a normally open circuit including oppositely acting members for shifting said band compressing member, means for intermittently closing and opening the circuit through one of said oppositely acting means for advancing the band compressing member successively from one speed unit to the other, and means for intermittently closing and opening the circuit through the other oppositely acting means for reversing the direction of movement of said band compressing member.

9. A variable speed mechanism comprising a plurality of variable speed units of the planetary gearing type, a shiftable gear operating member, a worm shaft on which said member is threadedly engaged for movement longitudinally thereof, a driving shaft geared with said worm shaft, a normally opened circuit including oppositely acting drums mounted on the drive shaft and coupled thereto by planetary gearing, means for intermittently closing and opening the circuit through one of said oppositely acting drums for advancing the gear operating member successively from one speed unit to the other, and means for intermittently closing and opening the circuit through the other oppositely acting drum for reversing the direction of movement of said gear operating member.

In testimony whereof we affix our signatures.

GRAHAM J. BARTON.
HUGH E. MITCHELL.